Figure 9:
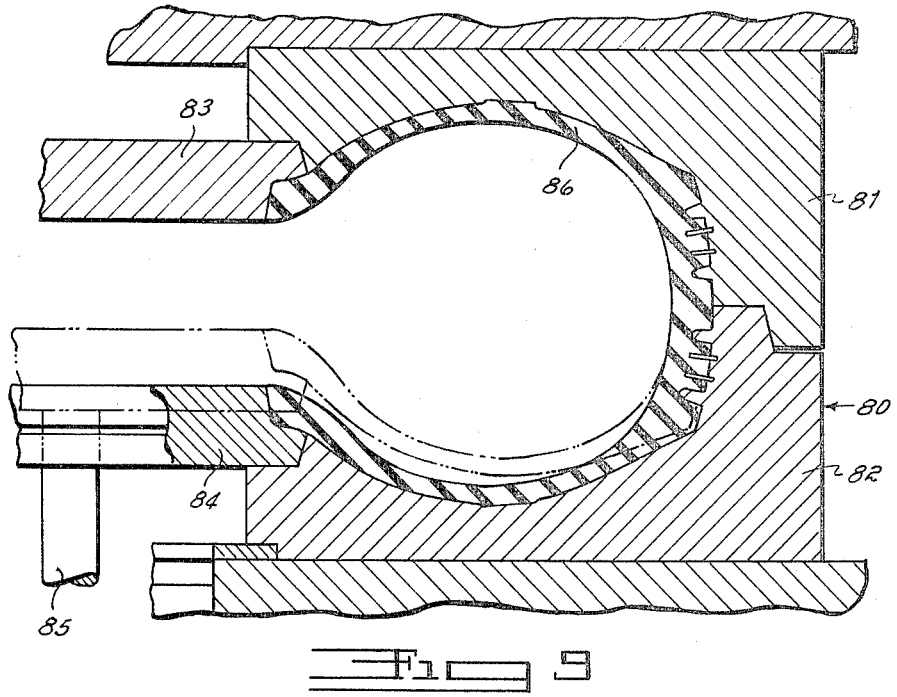
Figures 10, 11:
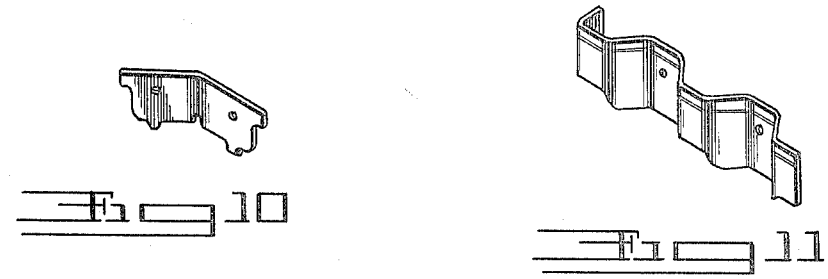
Figure 12:
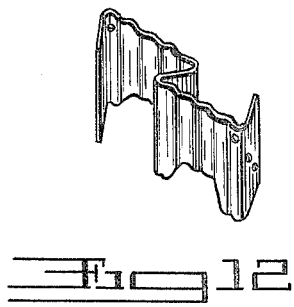
Figure 13:
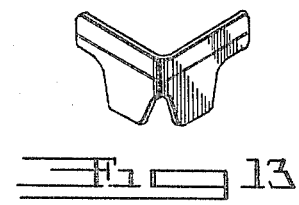

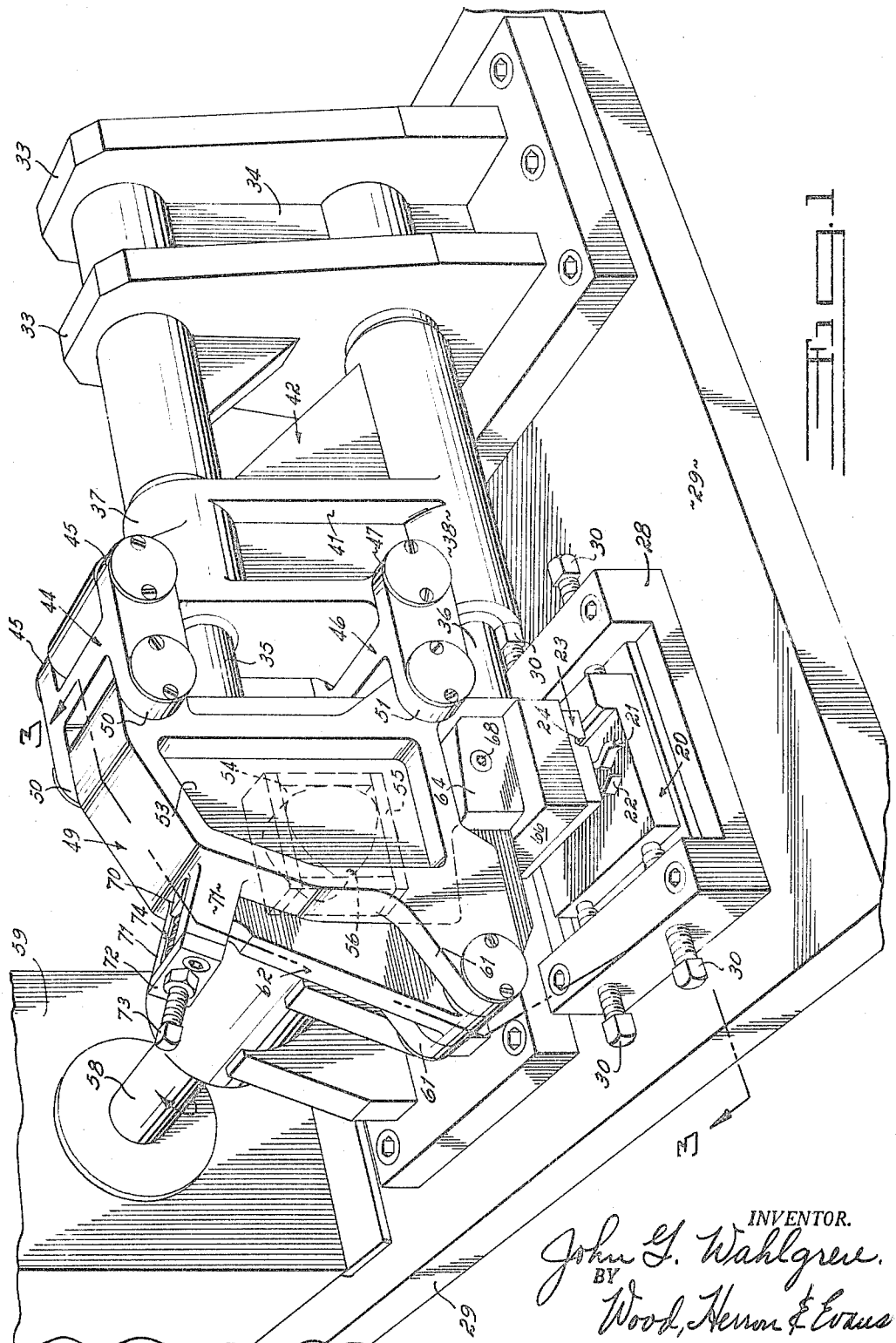

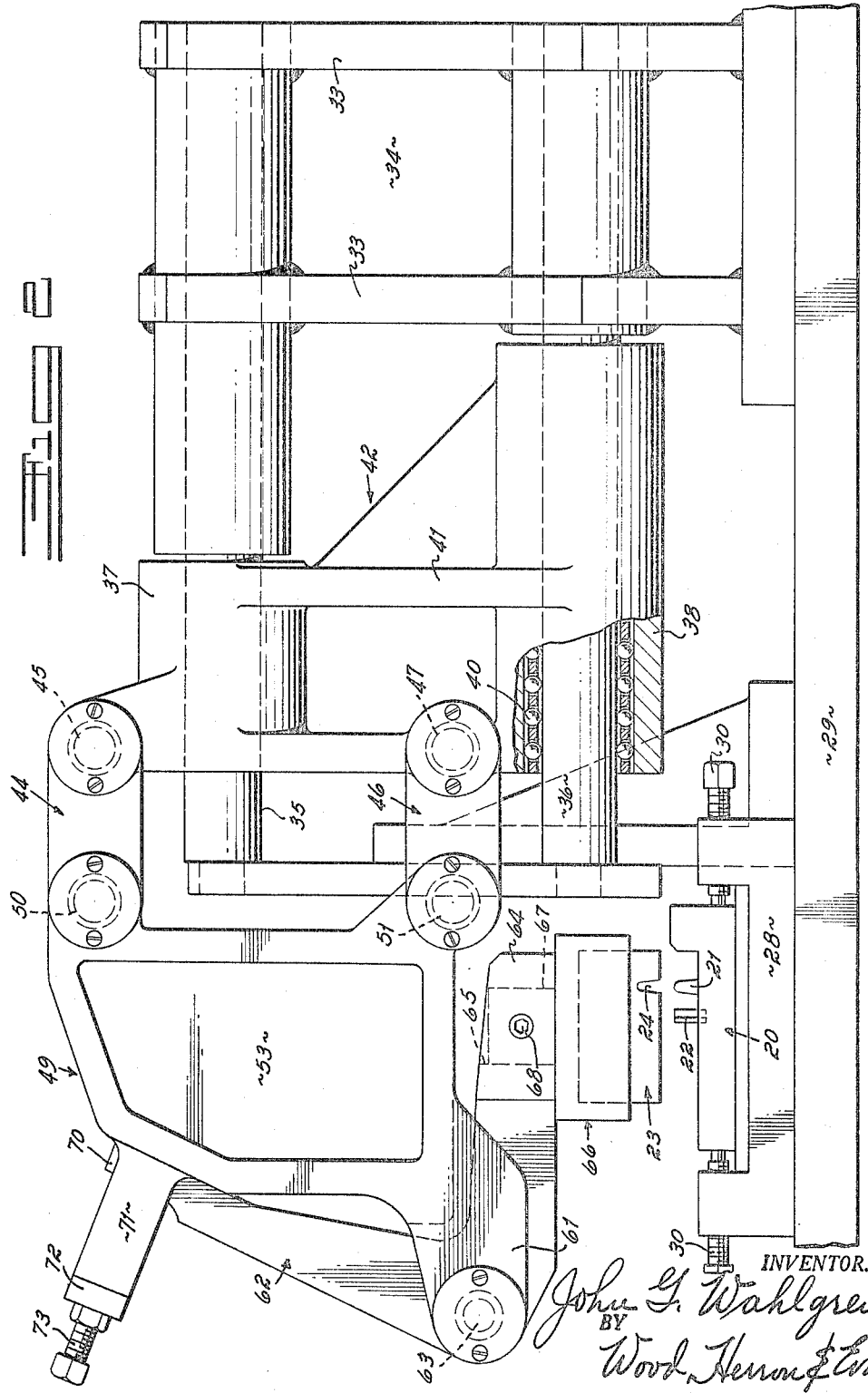

Sept. 27, 1966    J. G. WAHLGREN    3,274,825
APPARATUS FOR TESTING CONFIGURATED SIPES
Filed Feb. 4, 1964    5 Sheets-Sheet 3
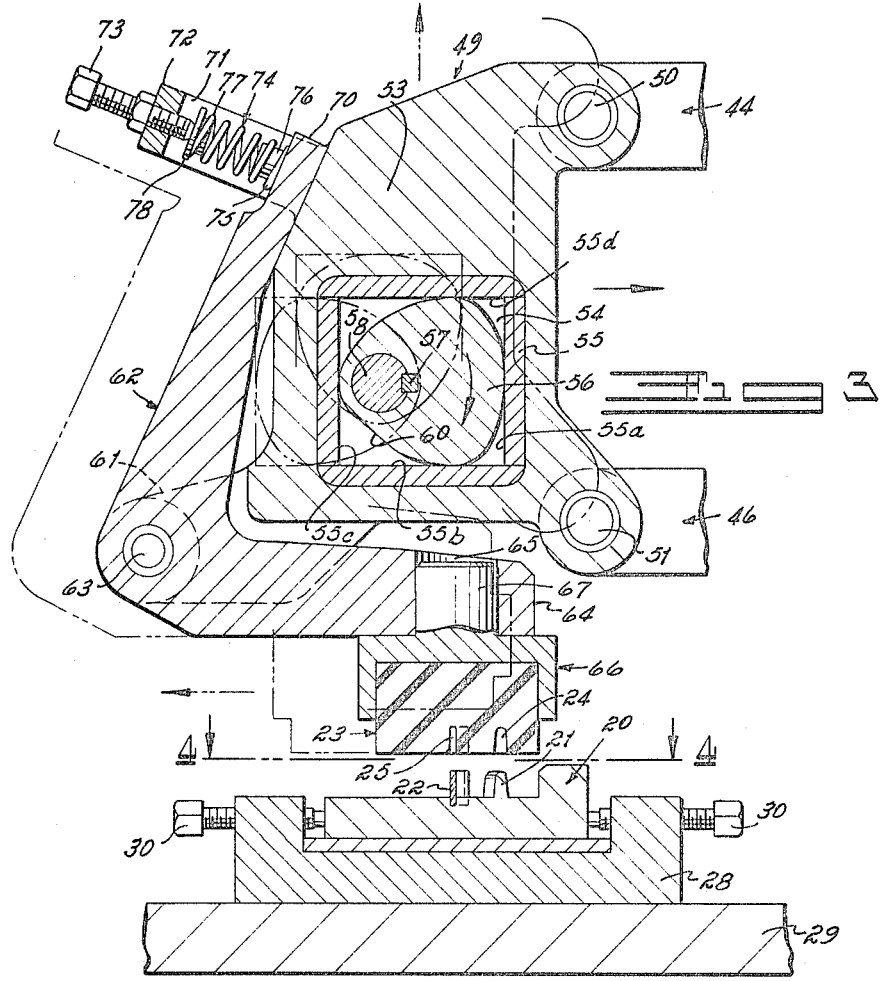
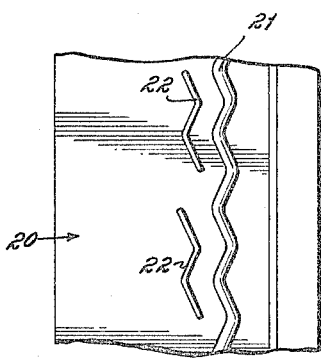
INVENTOR.
John G. Wahlgren
BY
Wood, Herron & Evans.
ATTORNEYS.

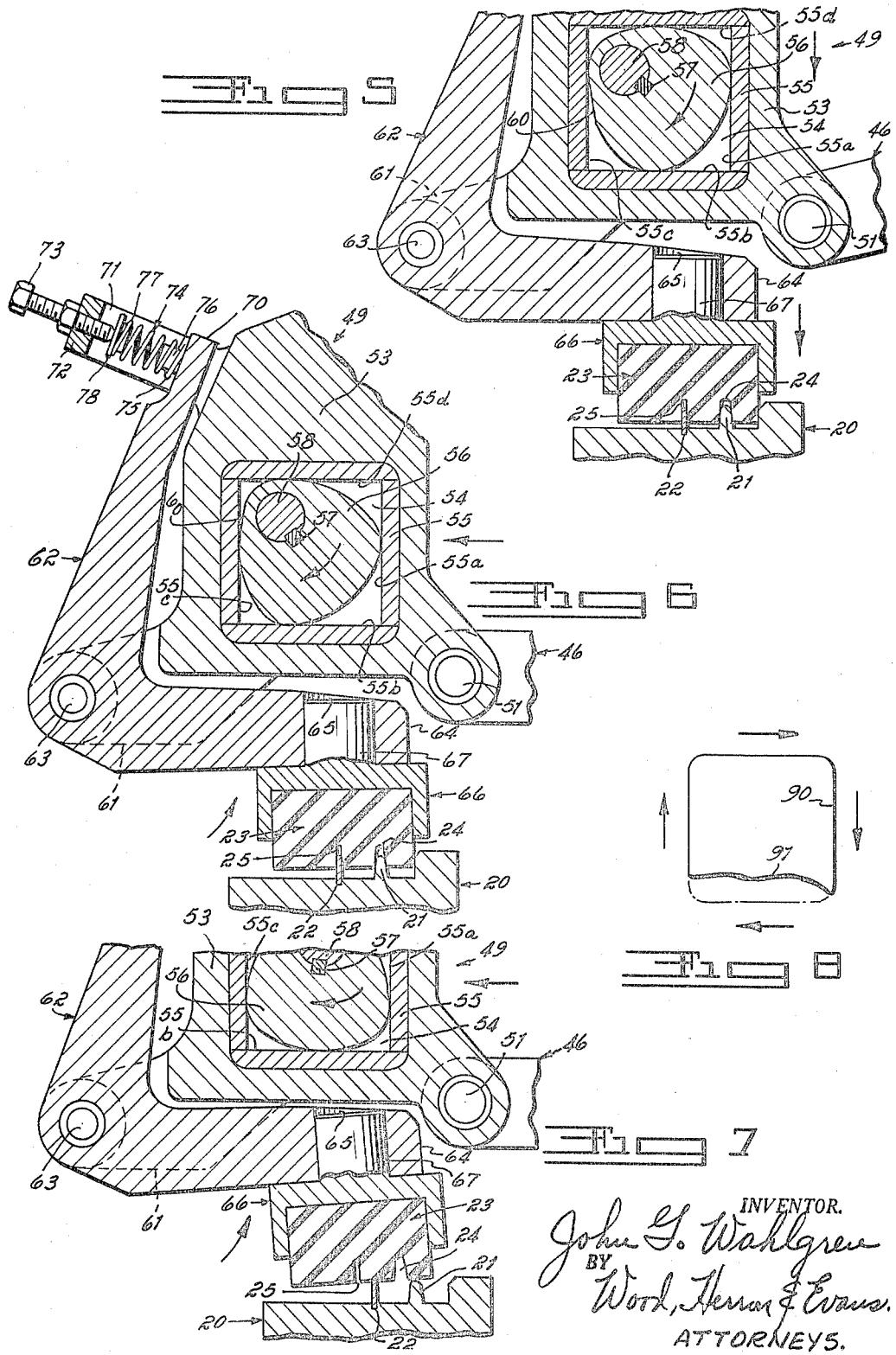

United States Patent Office 3,274,825
Patented Sept. 27, 1966

3,274,825
APPARATUS FOR TESTING
CONFIGURATED SIPES
John G. Wahlgren, Cuyahoga Falls, Ohio, assignor to
Abex Corporation, a corporation of Delaware
Filed Feb. 4, 1964, Ser. No. 342,509
9 Claims. (Cl. 73—100)

This invention relates to apparatus for testing configurated sipes and more particularly the invention is directed to apparatus which will cyclically impart to such sipes, the same stresses which are created when the sipes are used in the molding of tires.

A sipe is a small thin metal member which is mounted in a tire mold to form a narrow slit in the tread of a tire. Hundreds of sipes may be spaced about a tire mold and project into the mold cavity. The sipe has a special configuration which cooperates with the tread configuration so as to impart to the molded tire a slitted tread which provides maximum road gripping property to the tire.

When a tire is cured in a tire mold, the tire rubber surrounds all projecting surfaces of each sipe. In removing the cured tire from the mold, each sipe is subjected to a substantial bending stress because of the need of sliding the tire out of the mold in the direction transversely of the dominant sipe surfaces. Since a tire mold normally can be used to form several thousand tires, the bending stresses are repeated each time that a tire is molded. A tire mold may have, for example, several hundred sipes, and the breakage of any one sipe during the operation not only results in a defective tire, but renders the whole tire mold useless until the broken sipe has been replaced. The replacement of the sipe is an exacting operation which often requires the mold to be removed from the production line in order to be repaired.

It is obviously of the utmost importance, therefore, to make as accurate as possible a determination of the ability of the sipe to withstand the rigors of usage before manufacturing the molds in which the sipes will be used. In my co-pending application Serial No. 234,142, filed October 30, 1962, now Patent No. 3,218,848, I have disclosed a sipe testing machine which is principally directed to fatique testing materials which might be employed in the manufacture of sipes. The objective of that machine is, insofar as possible, to subject the possible sipe material to the same stresses that the materials will normally encounter in actual usage. In the preliminary selection of metals which might be useful in the manufacture of sipes, the machine of that application is quite useful. However, I have found that sipes having different configurations will be subjected to different stresses which are a result of the particular configurations. Even if these different stresses were predictable, it would not be economically feasible to provide a special fatigue testing machine for each stress that might be encountered by a sipe of a particular configuration.

It has therefore been an objective of the present invention to provide apparatus adapted to receive a sipe of any desired configuration and to subject that sipe repeatedly to the stresses which it will encounter during actual usage in a tire mold. With this machine it is possible to form a sipe exactly as it is proposed to manufacture several hundred similar sipes for use in a newly designed tire mold. That single sipe can be subjected repeatedly to stresses which it will encounter in normal usage in a tire mold in order to determine whether that configuration and material of the sipe will have the required strength and resistance to fatigue necessary for the production of tires.

In the removal of a tire from a mold, the tire applies a substantial force in a transverse direction to the sipe, and as the tire is removed, the tire slides off the sipe as it moves transversely of the sipe. The invention provides apparatus which will cyclically simulate that movement of rubber with respect to a sipe held firmly in a fixture. To this end, the invention provides a fixture for a sipe, a rubber tire simulator adapted to be applied and removed from the sipe and a kinematic system for moving the tire simulator in a generally rectangular path whereby the simulator is applied in a direction generally parallel to the sipe surfaces and is removed generally transversely of the sipe surfaces.

It has been another objective of the invention to provide apparatus of the type described above in which an adjustable spring forms part of the mount for the tire simulator, the spring simulating the flexing of the whole tire as it is removed from the mold.

These and other objectives of the invention will become more readily apparent from the following detailed description taken in conjunction with the accompanying drawings in which:

FIG. 1 is a perspective view of a sipe testing machine,
FIG. 2 is a side elevational view thereof,
FIG. 3 is a cross sectional view taken along line 3—3 of FIG. 1,
FIG. 4 is a cross sectional view taken along line 4—4 of FIG. 3 showing a typical rib and sipe design in a mold,
FIGS. 5, 6 and 7 are fragmentary cross sectional views similar to FIG. 3 illustrating the sequence of operations of the apparatus,
FIG. 8 is a schematic view showing the rectangular travel of the pivot arm,
FIG. 9 is a diagrammatic cross sectional view of a tire mold illustrating the manner in which a tire is removed from a mold,
FIGS. 10 to 13 are perspective views of four typical sipes.

Referring to FIG. 1, the principal elements with which the invention is concerned are a tire mold simulator 20 having on the upper surface thereof a rib 21 of the type used in a tire mold to form a tread and a sipe 22; and a tire simulator 23 in the form of a rubber block having a groove 24 which mates with the rib 21 and one or more thin grooves 25 (FIG. 3) which mate with the sipes 22.

The mold simulator 20 is mounted in a positioning block 28 which is fixed to a base 29. The positioning block has four positioning screws 30 which are adjustable for the precise locating of the mold simulator 20 with respect to the tire simulator 23.

The apparatus which carries the tire simulator 23 and by which it is moved with respect to the mold simulator 20 is mounted on the base 29. Support for the apparatus is provided by a pair of brackets 33 interconnected by a web 34. A pair of vertically spaced, parallel shafts 35 and 36 are fixed in the bracket and extend parallel to the base 29. A pair of sleeves 37 and 38 are mounted on the shafts 35 and 36 respectively for longitudinal sliding movement with respect to the shafts. Anti-friction elements formed by roller bearings 40 provide the means by which the sleeves 37 and 38 are mounted on the shafts. The shafts are rigidly interconnected by a web structure 41, the complete unit constituting an integral sliding block 42.

An H-shaped upper link 44 is pivoted at one end 45 to the sliding block and a similar lower link 46 is pivoted at one end 47 to the sliding block. The other ends of the links are pivotally connected to a carriage 49 at their ends 50 and 51 respectively. The sliding block 42, links 44 and 46 and carriage 49 form a parallelogram connection between the sliding block 42 and the carriage 49.

The carriage 49 has a vertical web 53 which has a square opening 54 which is lined by hardened inserts 55 presenting for bearing surfaces 55a, 55b, 55c and 55d.

Disposed within the opening 54 and in engagement with the exposed surfaces of the inserts 55 is a generally heart shaped cam 56 fixed by a key 57 to a shaft 58 (FIG. 3). The shaft 58 is rotatably driven by a motor and speed reducer 59. The cam 56 has one flat surface 60 which cooperates with the square opening of the carriage in such a manner as to facilitate the application of the tire simulator to the sipe and rib. The rotation of the shaft and its cam 56 with the flat surface 60 causes the carriage 49 to move in a generally square path as will be described in greater detail below.

The carriage 49 has a pair of projecting brackets 61 between which is pivoted a bell crank lever 62. The apex of the bell crank lever is pivoted on a pin 63 which is fixed between the two brackets 61. One end 64 of the bell crank lever is bored as at 65 to receive a head 66 having a cylindrical portion 67 which projects into the bore 65. A set screw 68 (FIG. 1) bears against the cylindrical portion 67 and fixes the head 66 in the carriage.

The other end 70 of the bell crank lever extends between a pair of posts 71 which project from the carriage 49. A cross bar 72 is fixed across the ends of the posts 71 and has an adjusting screw 73 threaded into it. A spring 74 has one end 75 bearing against the end 70 of the bell crank lever, the end of the spring being held in position by a pin 76 fixed to the end of the bell crank lever. The other end 77 of the spring is connected through a hat shaped element 78 to the adjusting screw 73. Spring 74 is a compression spring which normally urges the bell crank lever to pivot in a clockwise direction as viewed in the drawings thereby urging the head 66 containing the tire simulator 23 toward the mold simulator 20. The amount of pressure which the spring 74 applies to the bell crank lever and consequently the amount of pressure which the tire simulator applies to the mold simulator may be varied by adjusting the position of the screw 73.

OPERATION

The operation of the sipe testing apparatus can best be understood with a background of general understanding of the tire molding operation which subjects the sipes to the fatigue stresses. As indicated above, it is the objective of the invention to simulate and apply to sipes to be tested, as closely as possible, the same forces as occur during the normal usage of the sipes in tire molds.

In FIGS. 10 to 13 are illustrated four typical shapes of sipes. These sipes are quite thin (approximately one sixteenth of an inch or less), particularly as compared to the width of the tread forming grooves in the tire and have dominant surfaces 79 against which the tires apply a transverse stress during removal from the tire mold. The configuration of the sipes varies depending upon the pattern of the tire tread. The function of the sipes is to form, in the tire tread, very thin slits between the large tread forcing grooves, these thin slits serving to increase the traction which the tires apply to the road surface which they engage.

Several hundred of the sipes may be used in a single tire mold such as that which is diagrammatically indicated at 80 in FIG. 9. The tire mold comprises an upper half 81 and a lower half 82. At the radially inward edge of each mold half is a bead forming ring 83 and 84 respectively. The lower bead forming ring 84 is axially movable with respect to the mold half 82 by a rod 85 which is connected to a hydraulic ram (not shown). When the tire is moved from the mold, the upper mold half is first raised to free it from the cured tire indicated at 86. In this operation the tire applies a transversal force to the sipes and must flex inwardly to permit the sipes to move upwardly with the upper mold half. The tire is then driven out of the lower mold half by raising the bead forming ring 84. As can be seen from the broken line position of the ring 84 and the tire 86, the raising of the ring 84 with respect to the lower mold half 82 causes the tire to bend at the area of the location of the sipes. That bending force stresses the sipes to even a greater extent than they are stressed during the removal of the upper mold half, and in the process of repeatedly molding tires and removing them from the mold halves, the sipe will tend to fail.

When the tire and mold move relative to each other during the removal of the tire, the resilience of the tire permits it to flex radially inwardly in order for the sipes to pass over the tire tread. It is this relative movement of tire and sipes which the apparatus of the present invention is to simulate.

Referring to FIGS. 3 and 5 to 8, the rotation of the cam 56 in the square opening 54 of carriage 49 causes the carriage to follow a square path illustrated in FIG. 8. At the beginning of a cycle, the cam is in the position illustrated in FIG. 3 and the carriage is moving downwardly or in that segment of the path indicated at 90 in FIG. 8. It is important that the carriage move directly downwardly, that is parallel to the dominant surface of the sipes so that no stress is imparted to the sipe during the movement of the tire simulator 23 onto the sipe for this is not a stress which would normally occur in the molding operation. FIG. 5 illustrates the completion of that motion. During that movement the carriage 49 moves downwardly as permitted by the links 44 and 46. Simultaneously the slide block 42 slides toward the left on the anti-friction elements 40.

As the cam 56 attains the position of FIG. 5, it has a portion bearing against the surface 55b but the surface of 55c becomes spaced from the flat 60 of the cam. The space between surface 55c and the flat 60 remains until the cam has attained the position of FIG. 6. During these few degrees of rotation, there is no force on the carriage tending to move the carriage toward the left. There is only the downward force applied by the cam bearing on the surface 55b. It is in this critical period that the rubber tire simulator 23 is forced completely onto the sipe 22 and rib 21. The flat 60 and its spaced relationship to the surface 55c assures the precise application of the rubber block 23 to the rib and sipe without imparting any transverse stress during the application movement.

As the cam 46 continues to rotate from the position of FIG. 6 to that of FIG. 7, the carriage 49 is moved only in a leftward direction as indicated by the arrows. This is exactly the type of transverse movement which a tire has with respect to the ribs and sipes in a mold when the tire has been removed from the mold. The tire of course has a certain amount of resilience permitting it to compress and move away from the ribs and sipes, otherwise either the tire or ribs and sipes would fail in shear. Similarly, the apparatus of the invention has provision for resilience to permit the tire simulating block 23 to swing away from the sipe and rib. That resilience as attained through the compression spring 74 which permits the bell crank lever to swing in a counterclockwise direction as the carriage 49 moves in a leftward direction. The pivoting or swinging of the bell crank lever is caused by a force applied against the rubber block 23 at a point spaced well below the pivotal axis at 63 of the bell crank lever.

The upward swinging of the head 66, carrying with it the block 23, causes the block to follow the somewhat irregular path indicated at 91 in FIG. 8. That path is substantially identical to the path followed by the rubber tire in relation to the mold as it is being removed from the mold. The block 23 therefore substantially simulates the movement of a tire with respect to the sipes in a tire mold.

As the cam 56 continues to rotate, the carriage 49 will be swung upwardly as shown in broken lines in FIG. 3 and then toward the right until the solid line position of FIG. 3 is attained. Thereupon the cycle of operation is repeated as often as desired.

I claim:
1. Apparatus for testing sipes comprising,
a base for receiving the sipes to be tested,
means on said base for fixedly mounting a sipe,
a carriage mounted on said base for multi-directional movements in a plane normal to said base and transverse to the length of said sipe,
a head mounted on said carriage above said sipe mounting means,
a tire simulator mounted on said head with a mating portion for engagement with sipe,
and means for cyclically moving said carriage and head toward said sipe mounting means to apply said tire simulator to said sipe and thereafter moving said carriage transversely of said sipe.

2. Apparatus for testing sipes comprising,
a base for receiving the sipes to be tested,
means on said base for fixedly mounting a sipe,
a carriage mounted on said base for movements in a plane normal to said base and transverse to the length of said sipe,
a head mounted on said carriage above said sipe mounting means,
a spring urging said head toward said sipe mounting means,
a tire simulator mounted on said head with a mating portion for engagement with a sipe,
and means for cyclically moving said carriage and head toward said sipe mounting means to apply said tire simulator to said sipe and thereafter moving said carriage transversely of said sipe.

3. Apparatus for testing sipes comprising,
a base for receiving the sipes to be tested,
means on said base for fixedly mounting a sipe,
a carriage mounted on said base for movements in a plane normal to said base and transverse to the length of said sipe,
a head mounted on said carriage above said sipe mounting means,
a spring urging said head toward said sipe mounting means,
means for adjusting said spring force,
a tire simulator mounted on said head with a mating portion for engagement with a sipe,
and means for cyclically moving said carriage and head toward said sipe mounting means to apply said tire simulator to said sipe and thereafter moving said carriage transversely of said sipe.

4. Apparatus for testing sipes comprising,
a base for receiving the sipes to be tested,
means on said base for fixedly mounting a sipe and a tread forming rib spaced from said sipe,
a carriage mounted on said base for movements in a plane normal to said base and transverse to the length of said sipe,
a head mounted on said carriage above said sipe mounting means,
a rubber tire simulating block mounted on said head and having two grooves mating with said sipe and rib respectively,
and means for cyclically moving said carriage and head toward said sipe mounting means to engage said tire simulating block with said sipe and thereafter moving said carriage transversely of said sipe.

5. Apparatus for testing sipes comprising,
a base for receiving the sipes to be tested,
means on said base for mounting a sipe,
a bracket fixed to said base,
a pair of shafts fixed to said brackets and projecting parallel to said base,
a pair of sleeves slidably mounted on said shafts,
a carriage located above said sipe mounting means,
a pair of parallel links each pivoted at one end to a respective sleeve and at the other end to said carriage,
said carriage having a square slot,
a cam rotatably mounted in said slot to move said carriage horizontally and vertically,
a head pivotally mounted on said carriage for movement toward and away from said sipe mounting means,
a tire simulator mounted on said head with a mating portion for engagement with a sipe.

6. Apparatus for testing sipes comprising,
a base for receiving the sipes to be tested,
means on said base for mounting a sipe,
a carriage mounted on said base for universal movement in a vertical plane without changing the angular relationship of the carriage to said base,
said carriage having a square slot,
a cam rotatably mounted in said slot to move said carriage horizontally and vertically,
a head resiliently mounted on said carriage,
and a tire simulator mounted on said head with a mating portion for engagement with a sipe.

7. Apparatus for testing sipes comprising,
a base for receiving the sipes to be tested,
means on said base for mounting a sipe,
a carriage mounted above said base for universal movement in a vertical plane without changing the angular relationship of the carriage to said base,
a bell crank lever pivoted at its apex to said carriage, mounted on one end of said bell crank lever above said sipe mounting means,
a spring attached between the other end of said bell crank lever and said carriage to urge said head toward said sipe mounting means,
a tire simulator mounted on said head with a mating portion for engagement with a sipe,
said carriage having a square slot,
a cam rotatably mounted in said slot to cyclically move said carriage vertically and horizontally to apply said simulator to said sipe and then to move said simulator transversely of said sipe.

8. The method of testing sipes having side edges bounding dominant surfaces comprising the steps of,
holding one edge portion of a sipe in a fixed position, cyclically testing said sipe by elastically engaging the free portion of said sipe with a mating portion of a tire simulator and thereafter moving said tire simulator transversely of and parallel to said dominant surfaces until said tire simulator has slid off said sipe.

9. Apparatus for testing sipes comprising,
a base for receiving the sipes to be tested,
means on said base for mounting a sipe,
a bracket fixed to said base,
a pair of shafts fixed to said brackets and projecting parallel to said base,
a pair of sleeves slidably mounted on said shafts,
a carriage located above said sipe mounting means,
a pair of parallel links each pivoted at one end to a respective sleeve and at the other end to said carriage,
said carriage having a square slot,
a cam rotatably mounted in said slot to move said carriage horizontally and vertically,
a head pivotally mounted on said carriage for movement toward and away from said sipe mounting means,
a tire simulator mounted on said head with a mating portion for engagement with a sipe,
and an adjustable spring between said head and carriage.

References Cited by the Examiner

UNITED STATES PATENTS 2,113,389   4/1938   Smith _____ 73—100

RICHARD C. QUEISSER, *Primary Examiner.*

G. M. GRON, *Assistant Examiner.*